Nov. 20, 1934.  W. A. DOBSON  1,981,348
TYPEWRITING MACHINE
Filed July 8, 1933
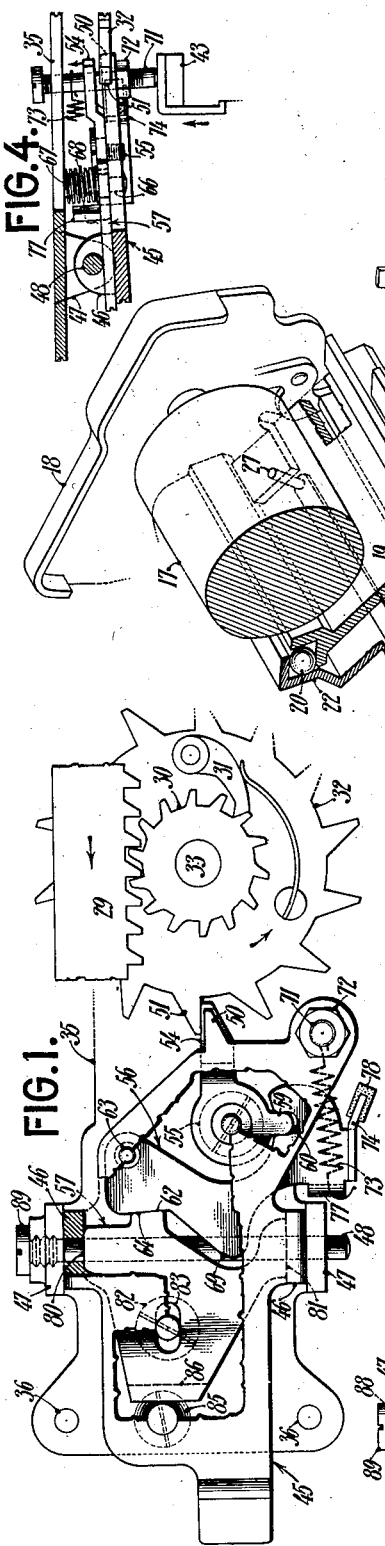
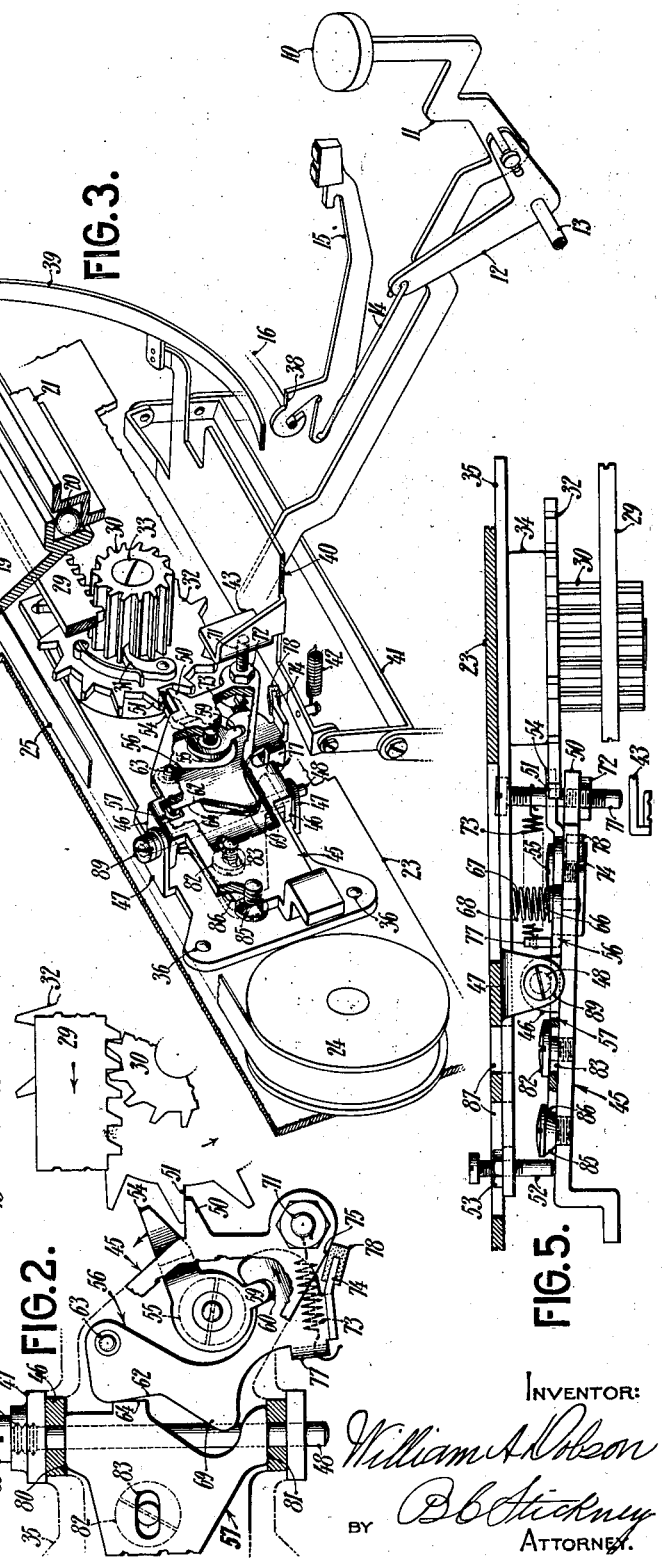
INVENTOR:
William A. Dobson
BY B. C. Stickney
ATTORNEY.

Patented Nov. 20, 1934

1,981,348

UNITED STATES PATENT OFFICE 1,981,348

TYPEWRITING MACHINE

William A. Dobson, Wethersfield, Conn., assignor to Underwood Elliott Fisher Company, New York, N. Y., a corporation of Delaware Application July 8, 1933, Serial No. 679,461

10 Claims. (Cl. 197—88)

This invention relates particularly to improvements for securing quiet, non-jarring operation of escapement mechanism for typewriter carriages.

The improved mechanism employs a dog-carrier which presents, for co-operation with the usual rack, a holding dog and a parallelly swinging stepping dog, the dog-carrier and escapement-rack being relatively vibrated upon operation of the typing machine keys.

For minimizing the noise and jarring occasioned by the arrest of the stepping dog, as the latter, after escaping from one escapement-rack tooth, is driven back against a stop by engagement with a succeeding tooth during the carriage-feeding step, the stop-face which the stepping dog presents against said stop is made to meet the latter at a comparatively sharp angle of incidence; that is, an angle substantially less than a right angle. Such acute angle of incidence, since, by reason thereof, abrupt impingement of the stepping-dog stop-face against the stop is avoided, is found to be very effective for minimizing noise and jarring. There is the advantage that reduction of noise effected in this manner, may be attained with an organization of simple parts, since there is simple separation and reapproach of the stepping-dog stop-face and stop. There is no complicated camming, rolling, or joint-movement interaction between said stop-face and stop, such as heretofore proposed in certain known devices. The stop which arrests the stepping dog may have broad contact with the stop-face of said dog.

The stop-face presented by the stepping dog may be embodied in a lever connected to the stepping dog to the end that there is less displacement of said stop-face from the stop than if said face were formed on the stepping dog itself. This reduced displacement of the stop-face and resulting reduced speed thereof at the moment of impact conduces to quiet operation of the mechanism. Means may be provided whereby the stop which causes the arrest of the stepping dog may be finely adjusted to establish its proper position.

A spring for effecting the escape movement of the stepping dog so the latter may engage a succeeding escapement-rack tooth, may conveniently be applied to the aforesaid lever connected to the stepping dog. Said lever may also have associated therewith a stop effective to limit said escape movement of the stepping dog and by reason of being associated with said lever, said stop may be conveniently cushioned to minimize the noise of impact as the escaped stepping dog is arrested.

The stepping dog, the lever, and the adjustable stop may be mounted in edgewise juxtaposition upon a common face of the dog-carrier. The stepping dog may be connected edgewise to said lever by tooth and notch articulation. Said dog-carrier in the illustrated form of the invention, is rockable relatively to a toothed escapement wheel connected to a pinion meshing with a letter-feeding rack on the carriage.

Other features and advantages will hereinafter appear.

In the accompanying drawing,

Figure 1 is a front elevation of the escapement mechanism showing the stepping dog, driven by the escapement wheel, arrested by means of the novel noiseless stop.

Figure 2 shows the stepping dog and its associate stop-face lever in the positions resulting from the swing of the dog-rocker and consequent interposition of the holding dog with the escapement wheel. Figure 2 also indicates the small displacement of the stop-face presented by the stepping dog from the co-operating stop.

Figure 3 is a perspective view showing part of the typewriter and the arrangement therein of the novel escapement mechanism.

Figure 4 is a top plan view showing the parts in the positions corresponding to Figure 2.

Figure 5 is a top plan view corresponding to Figure 1, some of the parts being sectioned for clearness.

Figure 3 represents a typewriting machine of the kind shown in my Patent No. 1,696,906 and to which the novel escapement mechanism is illustratively applied. Each type-train includes a key 10 on a key-lever 11 connected to a bell-crank 12 fulcrumed on rod 13 and connected by link 14 to a type-bar 15 swingable about a curved fulcrum-wire 16 to print against a platen 17.

The platen 17 is journaled in a pair of plates, only one plate 18 being shown, said plates rising from a truck 19 guided by anti-friction rollers 20 and front and rear tracks 21, 22 to travel in letter-feeding and return directions.

The usual frame embodying the carriage-tracks 21, 22 includes a cross-member 23 on which the novel escapement mechanism is mounted. Said cross-member 23 also carries a spring-drum 24 operative through a draw-band 25 connected to the carriage at 27 to draw the carriage in letter-feeding direction under control of the escapement devices. The truck 19 carries a letter-feeding rack 29 which meshes with a pinion 30 connected by a spring-pressed one-way pawl 31 to a toothed escapement wheel 32 having a spindle 33 mounting said pinion. An anti-friction bearing for the escapement wheel and pinion is indicated at 34, Figure 5, and is supported by a plate 35 which also carries the novel dog-rocker to be presently described. Said plate 35 is secured to the track-frame cross-member 23 by screws or rivets 36.

Each type-bar 15 has a heel 38 to displace the usual escapement actuating universal bar 39 rearwardly at the end of the type-bar printing stroke. Said universal bar is part of a frame 40 guided for fore-and-aft movement by means of a pivoted bail 41 pivotally connected to the frame 40 at the rear, said frame being slidably supported at the front by means not shown. Upon recession of the type-bar 15 from the platen 17 after printing, a spring 42 draws the universal bar 39 and its frame 40 forwardly again against a suitable stop not shown.

An upstanding flange 43 of the universal-bar frame 40 engages the escapement-dog-rocker 45 which may be of plate-like form and having at its upper and lower edges turned ears which, thus spaced, fit between ears 47 of the plate 35. A pintle 48 passing through the ears 46, 47 co-operates with the latter to mount the dog-rocker to swing about the pintle-axis which is spaced to one side of the escapement wheel 32 so that the dog-rocker 45 presents as an integral part thereof a holding dog 50 for co-operation with escapement-wheel teeth 51.

The dog-rocker 45 is normally in such position, Figure 5, that the holding dog is out of the path of the escapement-wheel teeth 51, said position being determined by abutment of the dog-rocker with a stop-screw 52 threaded into the plate 35 and opposing a portion of the dog-rocker extending from the pintle in a direction opposite to the dog-carrying portion. Said normal rocker position is adjustable by turning the stop-screw 52 which may be locked by check-nut 53.

With the dog-rocker in the Figure 5 position, rotation of the escapement wheel 32 under the pull of the spring-drum 24 is checked by a stepping dog pivoted upon a headed stud 55 projecting from the rear face of the dog-rocker 45. The stepping dog 54 in turn is checked by abutment of a lever 56 with a stop-plate 57, the stepping dog having a tooth 59 articulated with a notch 60 of said lever to drive the latter which is pivoted upon a stud 63 projecting from the rear face of the dog-rocker 45.

A stop-face 62 presented by the lever 56 is so disposed relatively to the lever-pivot 63 that said stop-face approaches a companion face 64 of the stop-plate 57 at a sharp angle of incidence as will be evident from a consideration of Figures 1 and 2. This sharpness in the angle of incidence is found to be highly effective to minimize the noise of impact of the stop-face against the face 64.

The lever-arm of the stop-face 62, as measured by the distance a perpendicular drawn from the face 64 stands from the pivot 63, may be substantially shorter than the lever-arm from the pivot 63 to the point of connection of the lever 56 to the stepping dog 54. The lever thus acts to minimize the displacement of said stop-face 62 from the companion face 64 and it results that the speed of movement of the stop-face 62 is minimized, thereby conducing to minimize the noise of impact.

The lever-pivot 63 may be headed to retain the lever 56 flatwise against the dog-rocker and the pivot-head may have a stud 66 co-operative with a stud 67 of plate 35, Figure 5, to retain a coiled spring 68 which urges the dog-rocker 45 to the Figure 5 position.

The pintle 48 co-operates in retaining the lever 56 flatwise against the dog-rocker 45, said pintle, as seen in Figures 1, 4 and 5, overlying a part of the lever formed by a nose 69.

When the universal bar 39 and its frame 40 are displaced rearwardly, the frame-flange 43 by means of an opposing screw-stud 71 of the dog-rocker 45 swings the latter to the Figure 4 position. By said dog-rocker swing the stepping dog 54 is moved out of, and the holding dog 50 is moved into, the path of the escapement teeth 51. The stepping dog 54 thereupon escapes under the pull of a spring 73 to the Figure 2 position.

The Figure 2 position is determined by abutment of a tail 74 of the lever 56 with an edge 75 of the dog-rocker, said tail being formed by a bend in the lever to face said edge 75. The spring 73 may be conveniently applied to an inwardly-turned ear 77 of the lever 56 and may be anchored to the screw-stud 71 of the dog-rocker. The tail 74 may also be provided with a cushioning pad 78 which reduces the noise of its impact with said edge 75. The adjustment of the screw-stud 71 for proper engagement with the flange 43 may be held by a check-nut 72.

The dog-rocker 45 having been rocked to the Figure 4 position as the type-bar 15 reaches the platen, thereby causing the stepping dog 54 to escape to the Figure 2 position, it will be seen that recession of the type-bar 15 from the platen will permit the dog-rocker 45 under the pressure of the spring 68 to move back to the Figure 5 position. In so moving back the dog-rocker withdraws its holding dog 50 from the escapement-wheel path and at the same time returns the stepping dog 54, escaped as in Figure 2, to said path. The escapement wheel 32 is thereupon free to rotate under the pull of the spring-drum 24 and drives the stepping dog 54 back until the latter is arrested by the striking of the stop-face 62 against the stop-plate face 64 as in Figure 1. It will be seen at Figure 2 that the stop-face 62, when the stepping dog 54 is in escaped position, is but slightly separated from the companion face 64. This minimizing of stop-face displacement conduces to minimizing the noise of impact.

In order to establish the proper position of said face 64, the stop-plate 57 is adjustably secured to the dog-rocker 45. The stop-plate 57 may be formed as best shown in Figures 1 and 2, for sliding guidance in adjusting direction and accordingly has upper and lower edges 80, 81 bearing against the ears 46 of the dog-rocker 45.

A clamp-screw 82 for the stop-plate is threaded into the dog-rocker 45 and passes through an opening 83 elongated in the direction of stop-plate adjustment and co-operating with said screw 82 and edges 80, 81 to slidably guide said stop-plate.

For fine regulation for the stop-plate position, there may be threaded into the dog-rocker 45 a conical headed screw 85, the cone of which abuts a beveled edge 86 of the stop-plate 57. By turning the screw 85 one way or the other and keeping the edge 86 of the stop-plate against the screw, the position of the plate may be micrometrically adjusted. The adjusted position is secured by tightening the screw 82. The screws 82, 85 may be accessible through suitable openings 87 in the cross-member 23 and plate 35.

A similar opening gives access to the screws 52 and 71.

The dog-rocker pintle 48 may have at its upper end a screw 88 threaded into the upper ear 47 until the head 89 of the screw rests upon said ear, said threaded screw and head providing for easy removal and replacement of said pintle.

Variations may be resorted to within the scope of the invention, and portions of the improvements may be used without others.

Having thus described my invention, I claim:

1. In a typewriting machine having a power-driven letter-feeding carriage; a quiet escapement mechanism including a pivoted carriage stepping dog and a holding dog, said dogs mounted for co-operation with a toothed escapement member, a stop, and a pivoted lever connected to swing with the stepping dog, said lever having a stop-portion to strike said stop to arrest and thereby limit the carriage-advancing swing of the stepping dog, the lever-arm of said stop-portion being shorter than the lever-arm connected to the stepping dog so as to minimize the displacement of said stop-portion from said stop, thereby to minimize the noise of impact.

2. In a typewriting machine having a power-driven letter-feeding carriage; a quiet escapement mechanism including a pivoted carriage stepping dog and a holding dog, said dogs mounted for co-operation with a toothed escapement member, a stop, and a pivoted lever connected to swing with the stepping dog, said lever having a stop-face to strike said stop to arrest and thereby limit the carriage-advancing swing of the stepping dog, said stop-face arranged relatively to the lever-pivot so as to approach the stop at a comparatively sharp angle of incidence to thereby minimize the noise of impact, said stop being stationary during the approach of the stop-face.

3. Escapement mechanism constructed according to claim 2, the lever-arm of said stop-face being shorter than the lever-arm connected to said stepping dog so as to minimize the displacement of said stop-face from said stop, thereby conducing to minimizing the noise of impact.

4. An escapement-dog-rocker for letter-feeding mechanism of the character described, including a body-plate mountable to swing facewise and embodying at a swinging edge thereof a holding dog, a substantially flat stepping dog pivoted facewise to said body-plate and adjacent to the holding dog, a flat lever pivoted facewise to said body-plate at a pivot-point spaced from the stepping-dog pivot and articulated to the stepping dog to swing with the latter, a plate mounted on the face of said body-plate and arranged to act as a stop for said lever to thereby arrest and limit the carriage-advancing swing of the stepping dog, and means for finely adjusting said stop-plate and securing the same to the body-plate, to readily establish the proper position of said stop.

5. A step-by-step feeding escapement mechanism for a power-driven typing machine-carriage or the like, including a dog-carrier presenting a carriage stepping dog and a holding dog for co-operation with a toothed escapement member, said stepping dog being pivoted facewise on a face of said carrier, a lever mounted facewise on said carrier-face, the lever-pivot spaced laterally from the stepping-dog pivot to bring an arm of said lever in edgewise juxtaposition to an arm of said stepping dog, said arms being articulated by a tooth and notch connection, said lever having another arm arranged to abut said carrier to limit the swing of the stepping dog in the direction in which it escapes from one tooth to a succeeding tooth of said member, a spring to urge the stepping dog and lever in said escaping direction, and a stop on said carrier to limit the swing of the stepping dog and lever in the opposite, carriage-advancing direction.

6. The escapement mechanism constructed according to claim 5, the spring being applied to said lever and being anchored to said dog-carrier.

7. The escapement mechanism constructed according to claim 5, the lever presenting, edgewise, a stop-face against said stop, said stop-face arranged relatively to the lever-pivot, so as to approach the stop at a comparatively sharp angle of incidence, to thereby minimize the noise of impact as said stop and stop-face co-operate to arrest the advance of the carriage.

8. An escapement-dog-rocker for co-operation with a toothed member for advancing a power-driven carriage step by step; said rocker including a body-plate having spaced ears projecting from a face thereof for receiving a pintle, said body-plate having portions on opposite sides of the pintle-axis, one portion having at its swinging edge a holding dog, a stepping dog pivoted on said one portion, a stop-plate facing the other body-plate portion and extending under the pintle to present a stop-edge for limiting the carriage-advancing swing of said stepping dog, said stop-plate having opposite edges slidably fitting between said ears and extending transversely of the stop-edge, a slot in said stop-plate being spaced laterally from the pintle and parallel to the slide-edges, and a clamp-screw passing through said slot for securing the stop-plate to said body-plate, said ears co-operating with said screw to guide the plate in stop-adjusting direction when the screw is loosened.

9. The dog-rocker constructed according to claim 8, and having means for finely adjusting the stop-plate in its sliding direction when the clamp-screw is loosened.

10. The dog-rocker constructed according to claim 8, the body-plate presenting a cone-headed screw-stud, the side of the cone abutting the stop-plate edge opposite its stop-edge, turning of the screw serving to finely adjust by means of said cone the position of the stop-plate when the clamp-screw is loosened.

WILLIAM A. DOBSON.